(12) United States Patent
Mantiuk et al.

(10) Patent No.: US 9,965,031 B2
(45) Date of Patent: May 8, 2018

(54) SYSTEM AND METHOD FOR PROBABILISTIC OBJECT TRACKING OVER TIME

(71) Applicant: Mirametrix Inc., Montreal (CA)

(72) Inventors: Radoslaw Mantiuk, Szczecin (PL); Bartosz Bazyluk, Szczecin (PL); Rafal Mantiuk, Tregarth (GB)

(73) Assignee: Mirametrix Inc., Montreal (CA)

( * ) Notice: Subject to any disclaimer, the term of this patent is extended or adjusted under 35 U.S.C. 154(b) by 277 days.

(21) Appl. No.: 14/874,761

(22) Filed: Oct. 5, 2015

(65) Prior Publication Data

US 2016/0026245 A1    Jan. 28, 2016

Related U.S. Application Data

(63) Continuation of application No. PCT/IB2014/061090, filed on Apr. 29, 2014.
(Continued)

(51) Int. Cl.
*G06F 3/01* (2006.01)
*G06T 7/33* (2017.01)
(Continued)

(52) U.S. Cl.
CPC .............. *G06F 3/013* (2013.01); *G06T 7/11* (2017.01); *G06T 7/143* (2017.01); *G06T 7/215* (2017.01);
(Continued)

(58) Field of Classification Search
USPC ........................................................ 382/103
See application file for complete search history.

(56) References Cited

U.S. PATENT DOCUMENTS

| 7,436,980 | B2 * | 10/2008 | Sigal | G06K 9/32 |
| | | | | 382/103 |
| 7,536,030 | B2 * | 5/2009 | Wang | G06K 9/00208 |
| | | | | 382/103 |

(Continued)

FOREIGN PATENT DOCUMENTS

WO    WO 2013/059940 A1    5/2013

OTHER PUBLICATIONS

Sugano, Y. et al.; "Appearance-based Gaze Estimation using Visual Saliency"; IEEE Transactions on Pattern Analysis and Machine Intelligence; May 1, 2012; pp. 1 to 14; retrieved on Apr. 12, 2012 from http://ieeexplore.ieee.org/ielx5/34/59286/06193107.pdf?tp=&arnumber=6193107&number=4359286.

(Continued)

*Primary Examiner* — Ishrat I Sherali
(74) *Attorney, Agent, or Firm* — Brett J. Slaney; Blake, Cassels & Graydon LLP

(57) ABSTRACT

A system and method are provided for object tracking in a scene over time. The method comprises obtaining tracking data from a tracking device, the tracking data comprising information associated with at least one point of interest being tracked; obtaining position data from a scene information provider, the scene being associated with a plurality of targets, the position data corresponding to targets in the scene; applying a probabilistic graphical model to the tracking data and the target data to predict a target of interest associated with an entity being tracked; and performing at least one of: using the target of interest to determine a refined point of interest; and outputting at least one of the refined point of interest and the target of interest.

21 Claims, 9 Drawing Sheets

Related U.S. Application Data

(60) Provisional application No. 61/817,189, filed on Apr. 29, 2013.

(51) Int. Cl.
    *G06T 7/73*    (2017.01)
    *G06T 7/11*    (2017.01)
    *G06T 7/143*   (2017.01)
    *G06T 7/215*   (2017.01)

(52) U.S. Cl.
    CPC ............... *G06T 7/344* (2017.01); *G06T 7/75* (2017.01); *G06T 2207/20076* (2013.01); *G06T 2207/20101* (2013.01); *G06T 2207/20104* (2013.01); *G06T 2207/20164* (2013.01); *G06T 2207/20221* (2013.01); *G06T 2210/61* (2013.01)

(56) References Cited

U.S. PATENT DOCUMENTS

| | | | | |
|---|---|---|---|---|
| 8,111,873 | B2* | 2/2012 | Berthilsson | G06K 9/00771 |
| | | | | 382/103 |
| 8,219,438 | B1* | 7/2012 | Moon | G06Q 30/0201 |
| | | | | 705/7.29 |
| 8,649,606 | B2* | 2/2014 | Zhao | G06K 9/4671 |
| | | | | 382/159 |
| 9,489,743 | B2* | 11/2016 | Spector | G06T 7/60 |
| 9,734,587 | B2* | 8/2017 | Sun | G06T 7/248 |
| 2002/0039111 | A1* | 4/2002 | Gips | G06F 3/011 |
| | | | | 715/700 |
| 2011/0085700 | A1* | 4/2011 | Lee | G06Q 30/02 |
| | | | | 382/103 |
| 2011/0263946 | A1* | 10/2011 | el Kaliouby | A61B 5/1128 |
| | | | | 600/300 |
| 2012/0106793 | A1* | 5/2012 | Gershenson | G06K 9/00442 |
| | | | | 382/103 |

OTHER PUBLICATIONS

Gaze-driven Object Tracking for Real Time Rendering (GDOT)—YouTube video; Apr. 10, 2013; https://www.youtube.com/watch?v=W4hpgdNp3rA.

Feng, Y. et al.; "Hidden Markov Model for Eye Gaze Prediction in Networked Video Streaming"; Jul. 2011.

Jarodzka. H. et al.; "A Vector-based, Multidimensional Scanpath Similarity Measure"; Jan. 20, 2010.

Alnajar, F. et al.; "Calibration-Free Gaze Estimation Using Human Gaze Patterns"; Dec. 2013.

Hillaire, S. et al.; "A Real-Time Visual Attention Model for Predicting Gaze Point During First-Person Exploration of Virtual Environments"; Nov. 2010.

Kärrsgård, I. et al.; "Eye movement tracking using hidden Markov models"; Master's Thesis; Computer Science and Engineering Program, Chalmers University of Technology.

Gould, S. et al.; "Peripheral-Foveal Vision for Real-time Object Recognition and Tracking in Video"; Jan. 2007.

Wiedmeyer, V.; International Search Report from corresponding PCT Application No. PCT/IB2014/061090; search completed Aug. 21, 2014.

* cited by examiner

SYSTEM AND METHOD FOR PROBABILISTIC OBJECT TRACKING OVER TIME

CROSS-REFERENCE TO RELATED APPLICATIONS

This application is a continuation of International PCT Application No. PCT/IB2014/061090 filed on Apr. 29, 2014, which claims priority to U.S. Provisional Application No. 61/817,189 filed on Apr. 29, 2013, both incorporated herein by reference.

TECHNICAL FIELD

The following relates to systems and methods for object tracking, in particular object tracking using point of interest data and knowledge of movement of objects in a scene.

DESCRIPTION OF THE RELATED ART

In many fields, determining the association between a signal and the scene it refers to is essential. Nonetheless, it is not uncommon for the provided signal to contain significant inherent noise, often making the determination inaccurate and prone to error. For example, the human gaze can be considered a particularly good pointing device, which can be faster, more intuitive and requires less effort from the user than operating an input device, such as a computer mouse or a touch screen. However, due to both the properties of the human visual system and errors inherent in current gaze tracking devices, the provided point-of-gaze information is usually too noisy for its desired uses. Given the importance of eye motion in human regard, it can be considered a drawback of current systems that they are unable to reliably use this information.

SUMMARY

In one aspect, there is provided a method of object tracking in a scene over time, the method comprising: obtaining tracking data from a tracking device, the tracking data comprising information associated with at least one point of interest being tracked; obtaining position data from a scene information provider, the scene being associated with a plurality of targets, the position data corresponding to targets in the scene; applying a probabilistic graphical model to the tracking data and the target data to predict a target of interest associated with an entity being tracked; and performing at least one of: using the target of interest to determine a refined point of interest; and outputting at least one of the refined point of interest and the target of interest.

In another aspect, there is provided a computer readable medium comprising computer executable instructions for performing the above method.

In yet another aspect, there is provided a system configured to perform the above method.

BRIEF DESCRIPTION OF THE DRAWINGS

Embodiments will now be described by way of example only with reference to the appended drawings wherein.

DETAILED DESCRIPTION

Figure 1A:
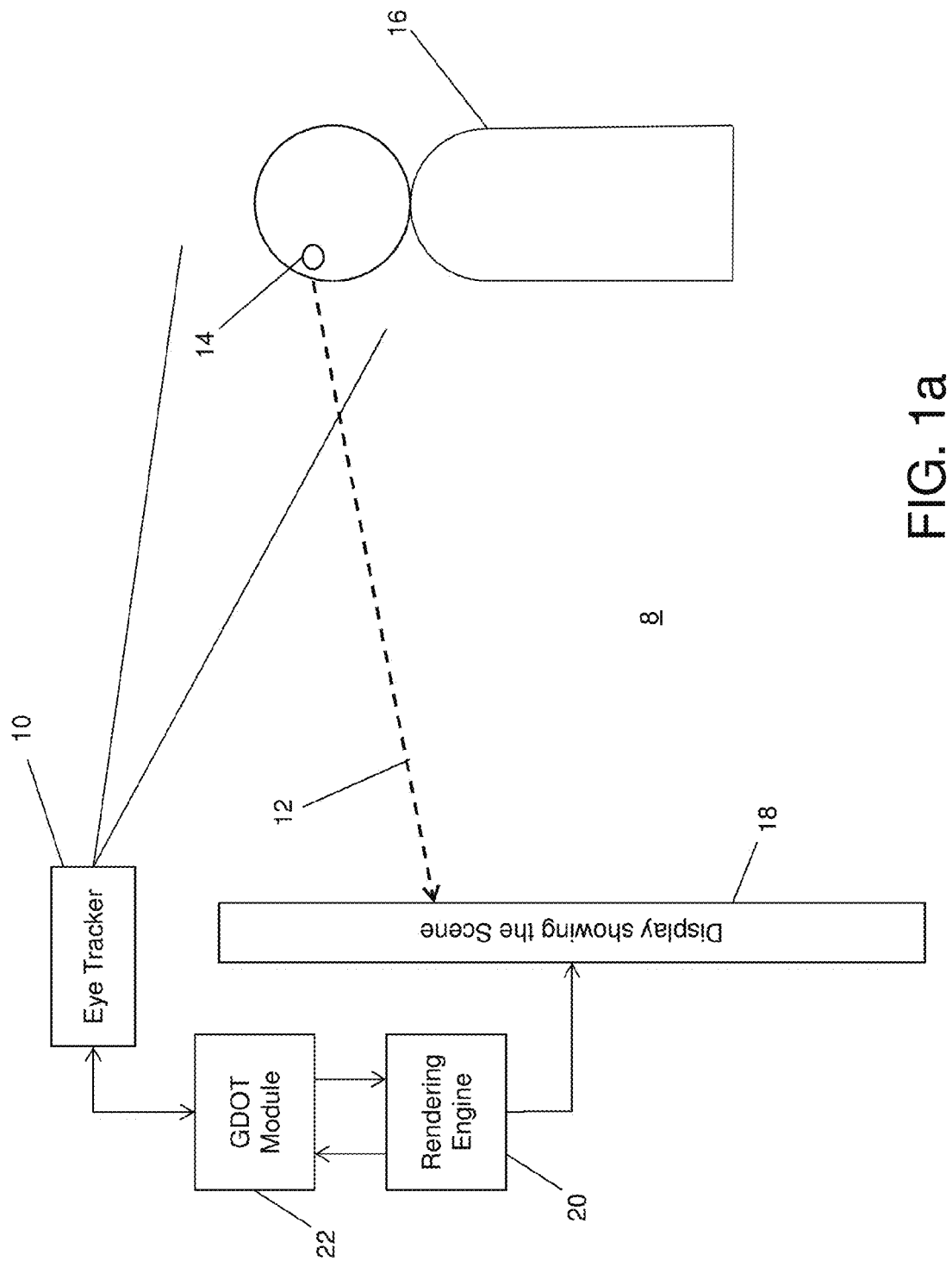
FIGS. 1a, 1b and 1c are schematic diagrams of tracking environments.

It will be appreciated that for simplicity and clarity of illustration, where considered appropriate, reference numerals may be repeated among the figures to indicate corresponding or analogous elements. In addition, numerous specific details are set forth in order to provide a thorough understanding of the examples described herein. However, it will be understood by those of ordinary skill in the art that the examples described herein may be practiced without these specific details. In other instances, well-known methods, procedures and components have not been described in detail so as not to obscure the examples described herein. Also, the description is not to be considered as limiting the scope of the examples described herein.

It will be appreciated that the examples and corresponding diagrams used herein are for illustrative purposes only. Different configurations and terminology can be used without departing from the principles expressed herein. For instance, components and modules can be added, deleted, modified, or arranged with differing connections without departing from these principles.

It has been recognized that by more precisely predicting what the user is observing, one may not only gain a very effective selection device, but also enhance the display of content with interest-contingent capabilities. For example, accommodation-related focal cues could be simulated to enhance the visual experience without a need for multi-focal displays.

It has also been recognized that a limiting factor of being able to use interest tracking such as gaze tracking, as input in the above-noted context, is the accuracy of the signal tracking device being used, e.g. the eye-tracker in gaze tracking. Typically this limiting factor can be difficult to overcome as most eye-trackers rely on faint corneal reflections and are affected by head movements, lids occluding the pupil, variation in lighting, shadows, and sunlight interfering with the infrared (IR) light sources, to name a few. However, even if perfect registration of the eye position and orientation was possible, eye movements are found to not strictly follow the attention patterns of the visual system. Even if an observer is focused on a single point, the eye wanders around that point because of the saccadic eye movements and tremors.

To efficiently deploy signal tracking such as eye-tracking, the system described herein employs a probabilistic-based process for predicting the patterns of user fixations in displayed scenes from potentially noisy signal-tracker data. For the example of eye tracking, the system described below can be configured to utilize both the eye-tracker data and predetermined or otherwise known information about the scene to improve the accuracy, robustness and stability of the gaze-contingent component of the interaction scheme. A probabilistic model is used, which assigns the likelihood that one of the predefined target points is attended.

For the purposes of this document, the term scene refers to a composition of objects. This could encompass a rendered scene (e.g. a 3D environment in a video game). The scene could also correspond to a video feed of a camera whose field-of-view contains a user's line-of-sight or to any other kind of an observable visual system or scene. It is assumed here that the scene is visible to the user; that is, that the user's line-of-sight could at some point in time intersect with objects in the scene. As such, any type of scene may benefit from the principles discussed herein, particularly those where a priori knowledge of the objects in the scene is known.

As discussed in greater detail below, in this discussion, a single physical object may be approximated by one or more targets that are associated with the object; and which may be considered dimensionless entities (e.g., these can be imagined as points in space), that abstract and/or adhere to the semantic characteristics of the object. These targets are invisible to the observer during normal operation, but are input to the GDOT module described below.

Eye-tracking can be used, for example, to induce focal cues via gaze-contingent depth-of-field rendering, add intuitive controls to a video game or computer environment, create a highly reliable visual saliency model, etc. The computed probabilities described below leverage a consistency of the gaze scan-paths to the position and velocity of a moving or stationary target. The temporal characteristic of eye fixations is imposed by a probabilistic graphical model (PGM), such as the Hidden Markov Model (HMM), which steers the solution towards the most probable fixation patterns. The process described herein can be demonstrated by various eye-tracking experiments. For example, in one experiment, actual eye-tracker readings and the position of the target an observer was asked to follow were used to calculate the tracking error over time. In a second experiment a Just Noticeable Difference (JND)-scaled quality metric was derived, that quantifies the perceived loss of quality due to the errors of the tracking algorithm. Since the loss of quality is formed by two types of inaccuracy: error rate and error frequency, experimentally finding the perceptual relation between them and the observers' quality judgment allowed for later evaluation of tracking algorithms. A noticeable outcome of this experiment was that a high tracking error frequency is often reported as significantly more intrusive than a high error rate. Data from both experiments were used to confirm the applicability of the examples described herein and to evaluate performance of the methods. In results of both experiments the method described herein has been found to outperform commonly used alternatives (i.e. fixation algorithms), by providing a much lower error frequency and often noticeably lower error rate. It was also shown that the described method is able to track objects smaller than the nominal error of an eye-tracker.

In at least one aspect, the following provides a tracking method that utilizes the information about a scene and animation within the scene. The scene serves as prior knowledge for the algorithm and improves the accuracy above the signal-tracking error. It has been found, in eye-tracking applications, that this method provides advantageous improvements, based on the simulation of focal depth cues, as a pointing device in a computer game, and an attention model. Such applications require fairly accurate information about the exact point the user is looking at, a so called "fixation point". The advances in eye-tracking allow determining the instantaneous gaze-direction in a convenient, non-invasive and potentially inexpensive manner by registering an infrared image of the pupil and a corneal reflection. It has been recognized that currently, an important limitation of the corneal-pupil eye-tracking is its accuracy. Even high-end devices report a standard error of gaze-point measurement ranging from 1 and 1.5 visual degrees, which corresponds to the spread of gaze points of 100 or more pixels on a typical desktop display. Such accuracy is not sufficient for most real-time applications. The following system provides increased accuracy for eye tracking systems, and in some examples the outputs of the system can be used to perform operations such as calibration, etc.

An exemplary eye tracking environment 8 is shown in FIG. 1a. The eye tracking environment 8 in this example uses an eye tracker 10 to determine and track the point of gaze (POG) of a line of sight 12 of the eyes 14 of a user 16 or subject. In this example, the POG is being directed towards a scene being shown via display 18 such as a 3D television or other visual output device. The eye tracker 10 is coupled to or otherwise includes a gaze-driven object tracking (GDOT) module 22, which is coupled to a rendering engine 20. The rendering engine 20 is coupled to or otherwise in communication with the display 18 and is used to render a scene using the display 18 and includes or has access to information about the scene, to assist the GDOT module 22 in determining the target of interest and optionally, providing a refined POG for the eye tracker 10 as will be explained in greater detail below.

Figure 1B:
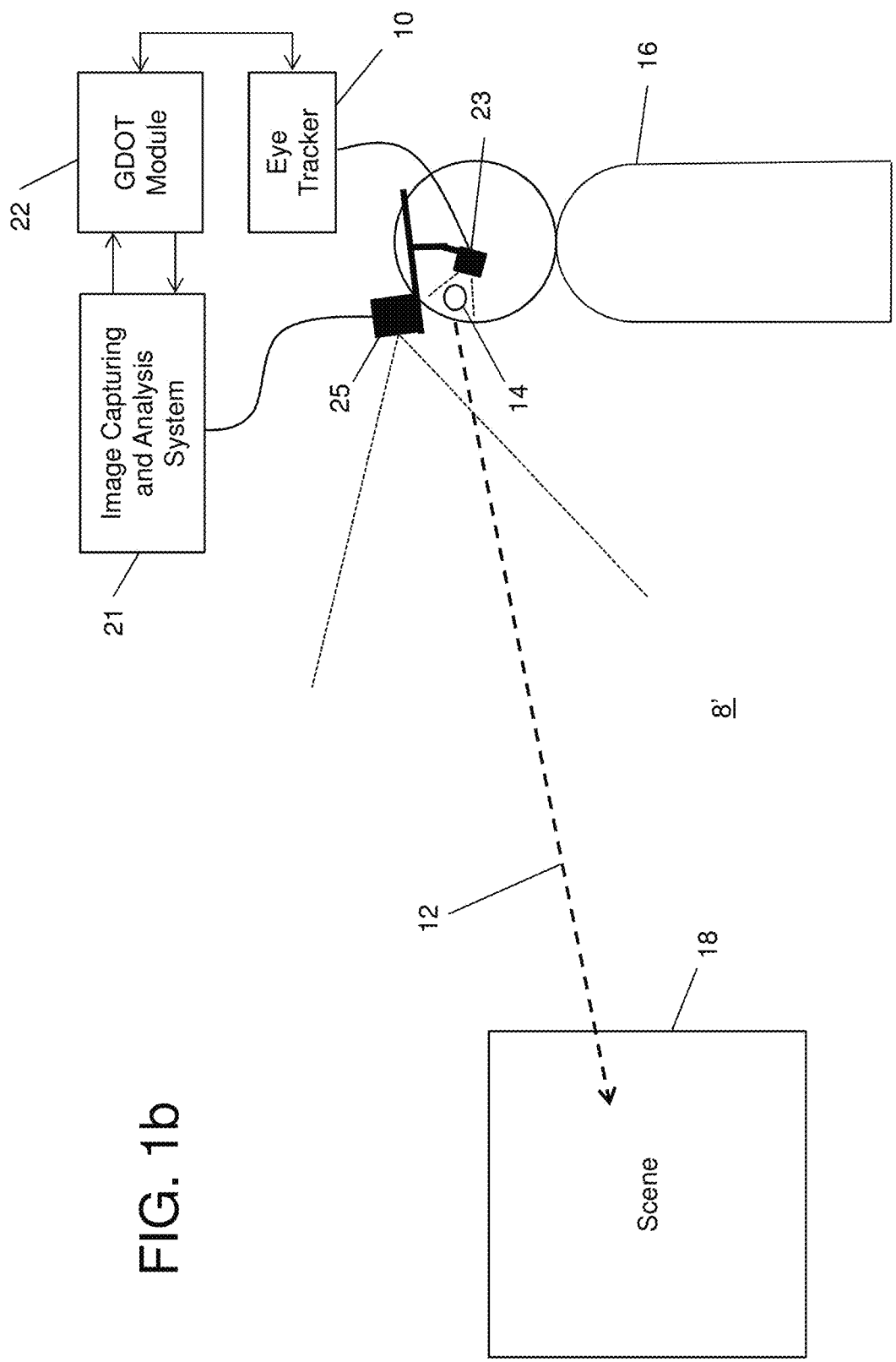

FIG. 1b demonstrates a slightly different eye tracking environment 8', where the scene 18 is not tied to a rendering engine 20. Here, a user 16 is wearing a head-mounted device 23, having an eye tracker 10 and a front-facing camera module 25, containing within its field-of-view (FOV) the line of sight 12 of the eyes 14 of the user 16. In this situation, the scene 18 is restricted by that which is visible within the FOV of camera module 25. Here, the camera module 25 is coupled to or otherwise includes an image capturing and analysis system 21, which is capable of analyzing the scene 18, determining and tracking objects, and extracting targets to be fed to the GDOT module 22. The GDOT module 22 additionally communicates with the eye tracker 10, for obtaining gaze data and optionally providing refined gaze data.

Figure 1C:
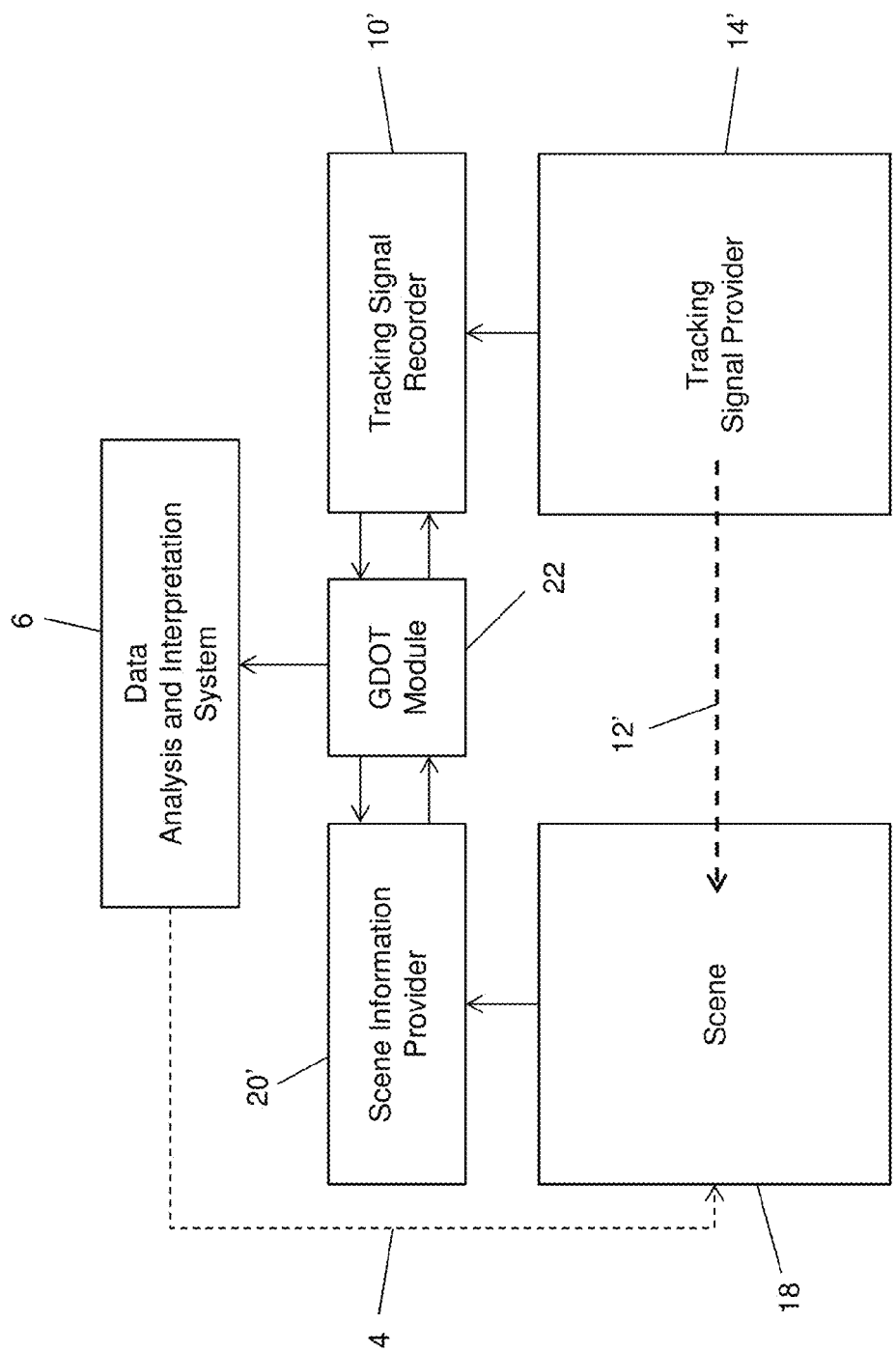

While FIGS. 1a and 1b illustrate that the GDOT module 22 can be used in different applications involving different types of scenes, FIG. 1c illustrates that these principles equally apply to any application in which a tracking signal is directed towards a point of interest (POI) in scene and this POI is monitored, i.e. environments beyond eye tracking. Turning now to FIG. 1c, the GDOT module 22 in this example is coupled to a tracking signal recorder 10' which observes a tracking signal 12' from a tracking signal provider 14', the example in FIGS. 1a and 1b being an eye tracker and eyes gazing at a scene 18. The GDOT module 22 is also coupled to a scene information provider 20', which is responsible for extracting targets from the scene, the examples in FIGS. 1a and 1b being a rendering engine 20 and front-facing camera and image recognition system respectively. The GDOT module 22 is also coupled to a data analysis and interpretation system 6 which uses processed tracking data (e.g. TOI/POI) which can be linked to the scene 18. The processed tracking data can either be utilized solely in Data Analysis and Interpretation module 6, or can routed back to scene 18 for an immediate feedback that is noticeable to the observer. In an eye tracking environment the first case could correspond to different saliency analysis applications, while the latter is typical for accuracy improvement algorithms that adaptively reduce the tracking error, or for gaze-contingent display features, or for gaze-driven user interface extensions. It should be noted that the GDOT module generally assumes that the data provided by the scene information provider 20" is both accurate and precise, whereas the signal provided by tracking signal recorder 10' can be both less accurate and less precise.

Figure 2:
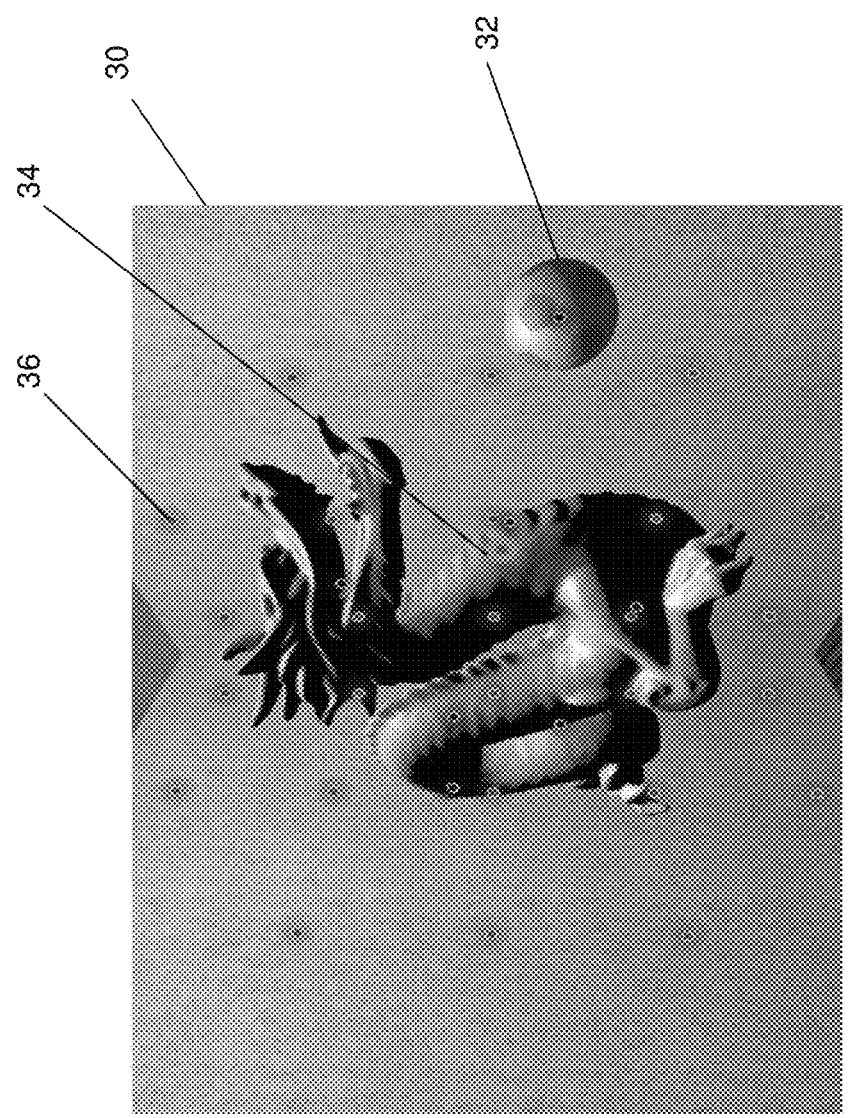
FIG. 2 is a three dimensional (3D) rendered scene with objects, associated targets, and points of gaze (POGs)

Turning now to FIG. 2, a rendered 3D scene 30 is shown, which has more information than only raw eye-tracker readings (such as an estimated POG 34 shown in FIG. 2), that are available to standard fixation algorithms. In this example system described herein, the 3D rendering delivers information about targets 36 in the scene, their positions, and movement paths. It may be noted that as described earlier, there is a distinction between objects 32, and targets 36. As described earlier, any single physical object 32 may have one or more targets 36. These targets 36 could correspond to logically important parts of an object 32, such as the eyes, nose, or mouth of a person's head. The determination of targets relative to objects is typically scene- and object-dependent, and performed offline for a particular scene. It should be appreciated that the target-assignment can also be performed using an automatic online system, and should not be considered limited to offline configurations. As discussed above, the GDOT module 22 combines data from the eye tracker 10 and information from the scene being rendered, and can be used to improve the accuracy of the eye tracking being performed.

It may be noted that the GDOT module 22 can be used in a system such as that shown in FIG. 1*a*, to simulate a dynamic and high quality depth of field (DoF) effect, among other applications such as for calibration. The gaze tracking used in real-time computer graphics is also advantageous in finding objects that are more likely attended at a given time.

Figure 3:
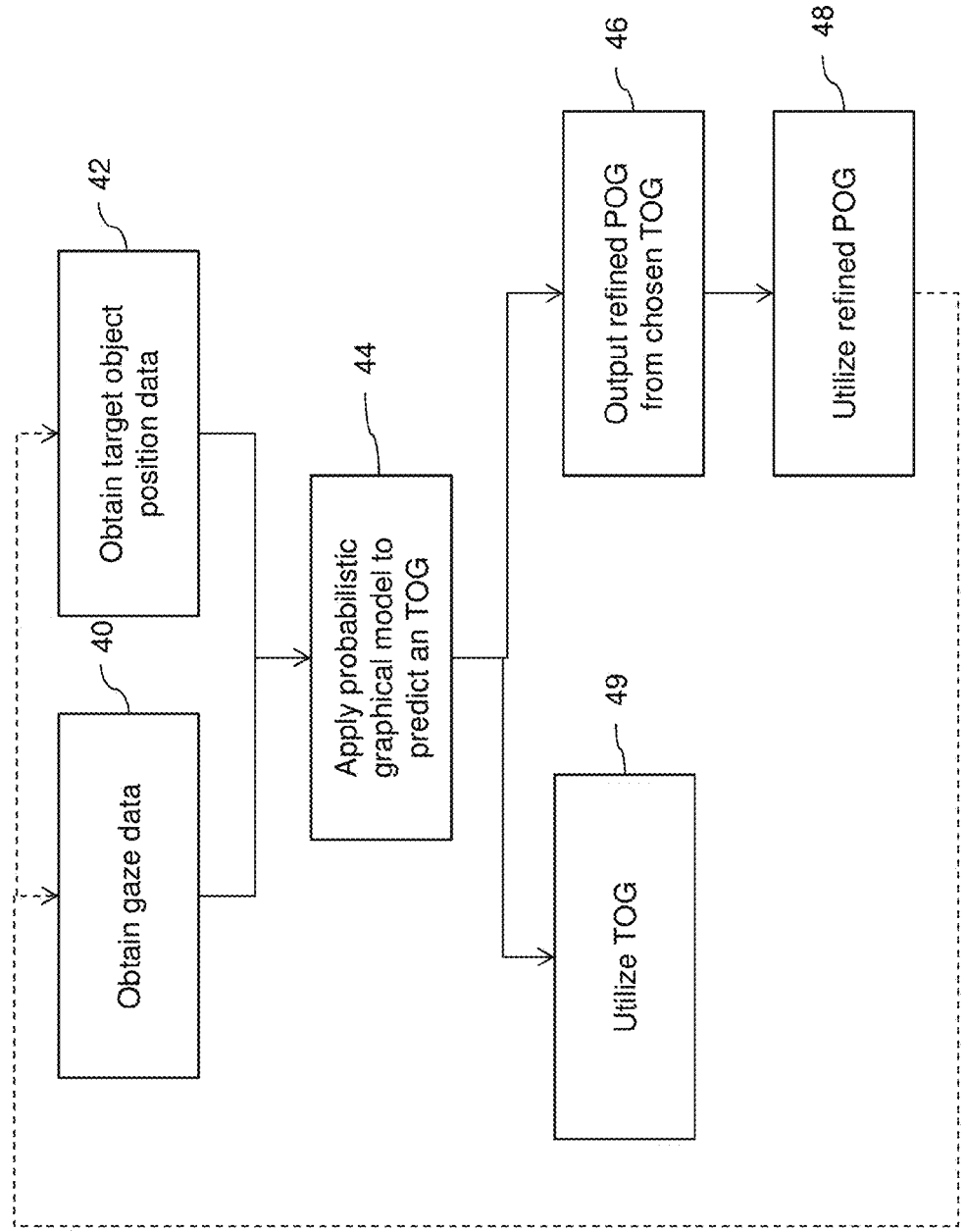
FIG. 3 is a flow chart illustrating example computer executable instructions performed by a gaze-driven object tracking (GDOT) module.

FIG. 3 illustrates operations that may be performed by the systems shown in FIGS. 1*a* and 1*b*, utilizing the GDOT module 22, e.g., to generate and utilize a refined POG or target-specific information. At 40 the gaze data is obtained from the eye tracker 10 and target object and position data is obtained from the rendering engine 20 or image capturing and analysis system 21 at 42. The data obtained at 40 and 42 are then used in applying a probabilistic graphical model (PGM) at 44 to predict target-specific information, herein named a target-of-interest (TOI). This TOI may then be used by the system, at 49, for less-granular applications, such as modifying a scene based on the user's target of regard (e.g, object selection, virtual character interaction, attention-based environment modification). Alternatively, a refined POG (or refined POI in the example shown in FIG. 1*c*) may be output at 46, using the TOI to refine the POG (for example, fitting the POG to the TOI centroid). The refined POG may be used, for example, in performing a calibration of the eye tracker 10 at 48. Other uses of the refined POG include depth-of-field rendering and interactive tone mapping.

Figure 4:
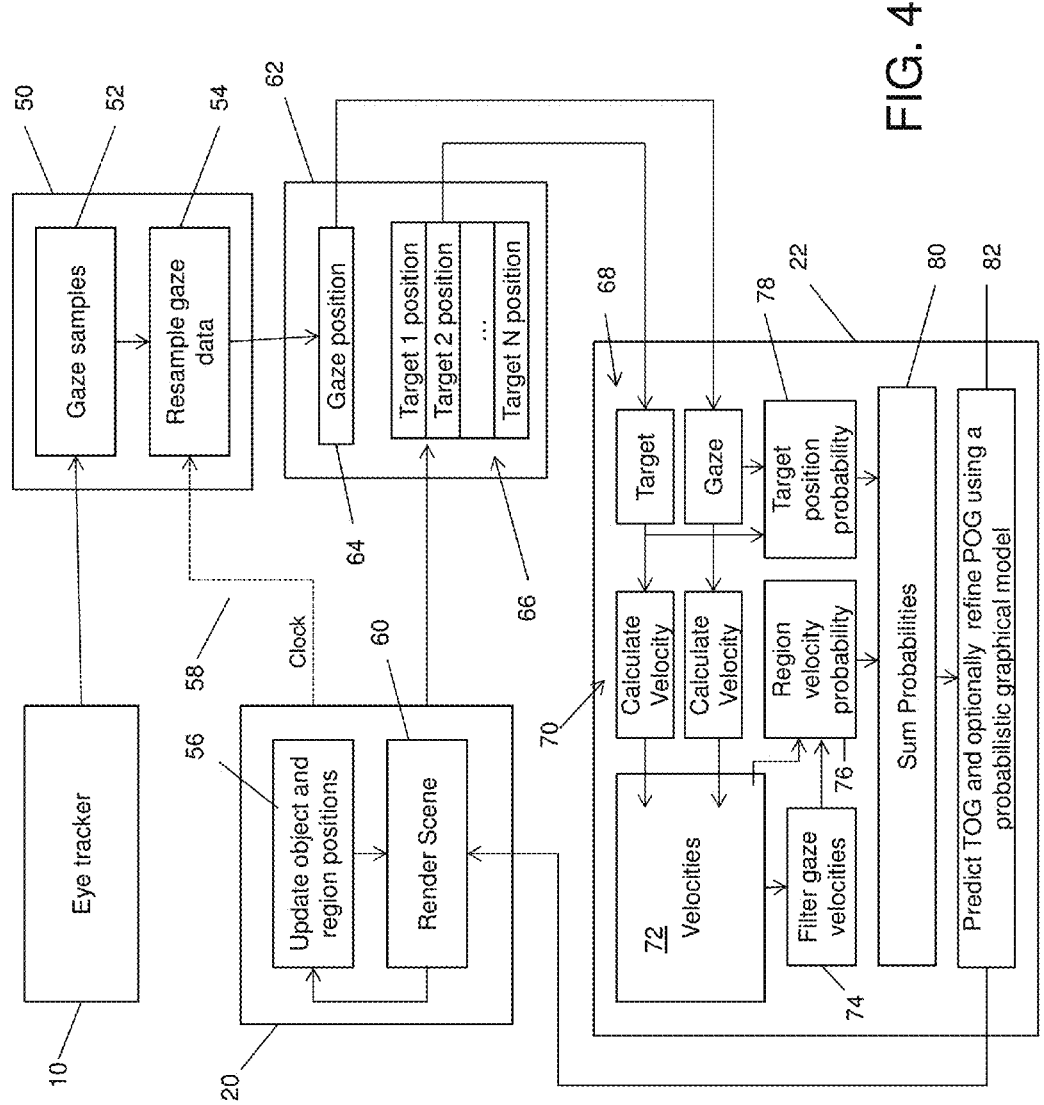
FIG. 4 is a schematic block diagram illustrating an example of a configuration for a GDOT module in an exemplary eye-tracking system.

Turning now to FIG. 4, further detail of the system shown in FIG. 1 is provided. As shown in FIG. 4, a first interface module 50 obtains and stores or caches gaze samples 52 provided by the eye tracker 10 and resamples the gaze data at 54. Because the frequency of eye-tracker readings is typically higher than that of the display 18, gaze positions are resampled to match the display refresh rate, but also to reduce the noise in the eye-tracker readings and inconsistencies in sampling. The sampling rate used to resample the gaze data 52 may be controlled by a clock signal 58 provided by the rendering engine 20.

The resampled gaze data determined at 54 is provided to a second interface module 62, which is stored or cached as gaze position data 64. The second interface module 62 also obtains target positions 66 from the rendering engine 20. It can be appreciated that the first and second interface modules 50, 62 may be included in the eye tracker 10, the GDOT module 22, the rendering engine 20 or may be split, coupled and/or provided in any suitable combination that performs the illustrated functionality.

The gaze position data 64 and target positions 66 are provided to a target and gaze collection stage 68 in the GDOT module 22. This data will be used to estimate the likelihood that the user is regarding a particular target. More specifically, the likelihood is modeled relative to the similarity of the user's gaze position to the target's position, and the user's displacement-derived information such as gaze velocity to the target's velocity. Each of the target and gaze data streams are used to calculate velocities in a velocity calculation stage 70 thus generating velocities 72 of both the target and the user's gaze. The target and gaze data are used to compute a target position probability at 78, and the velocities and filtered gaze velocities 74 are used to compute a region velocity probability at 76. The two probabilities are summed at 80 and a probabilistic graphical model is used at 82 to predict the TOI. This TOI may optionally be used to provide a refined POG (as at 46, in FIG. 3), which is provided to the rendering engine 20 as an input in rendering a scene at 60 and object and region positions are updated at 56 to provide fresh position data for the next iteration performed by the GDOT module 22. The object and region positions are then updated, since the animation displayed on-screen has advanced further in time, from the previous time instance (t0) to the next one (t1). GDOT then receives a new sample of target positions for t1. In parallel, the eye tracker collects new gaze samples which, after resampling, are provided to GDOT module 22 to begin its next iteration.

The targets 36 are usually the spots that are likely to attract a user's attention. Several targets 36 may be distributed over larger objects 32 and usually a single target 36 is allocated to each smaller object 32. A task of the GDOT module 22 is to select the most likely target of attention for the current time instance. This can be performed in an online system where only the information about past animation frames is available. For example, an identifier (ID) of the fixated target is passed back to the rendering engine 20, where this information may be used for a desired application, such as depth of field simulation.

For a target 32 to be attended, it should be close to the gaze point, and it should move with a similar velocity as the eye scan-path. Hence, the probability of fixating at the target i is:

$$P(o_i) = P(p_i \cup v_i) = 1 - (1 - P(p_i))(1 - P(v_i)), \quad (1)$$

where $P(p_i)$ is the likelihood that the gaze point is directed at the target $o_i$ (position is consistent) and $P(v_i)$ is the likelihood that the eye scan-path follows the target 36 (velocity is consistent). The sum of probabilities ($\cup$) is used for the position and velocity consistency because it is likely that either position or velocity is inconsistent even if the target 36 is attended. The position inconsistency is often caused by imperfect eye-tracker calibration, so that the gaze-points hit near but rarely at the target position. The velocity consistency is usually very low for stationary targets which have zero velocity while the eye-tracker readings indicate a constant movement of the eye. However, the consistency starts to be very high when the target 36 moves and the smooth pursuit eye-motion is getting registered by the eye-tracker 10. It should be noted that the probability of target description need not include solely position and velocity; any displacement-derived data could be used to estimate the probability of fixating on a target (e.g. acceleration).

A close distance between the eye-tracker gaze point and the target 36 has been observed to be the strongest indicator that an object is attended. However, care should be taken to properly model the likelihood that a particular distance indicates that an object is attended. Because the distance specifies all points on the circle around the target point, the circumference of the circle grows relative to the distance and consequentially the probability of observing such a distance, $P(d_i)$. This probability is due to the geometric properties of the distance and has no importance for the selection of the attended object. In discrete terms the histogram of observing a distance for the target needs to be normalised by the area of the annulus covering all pixels belonging to a particular bin of the histogram. Such normalisation is the consequence of the Bayesian rule:

$$P(p_i) = \frac{P(d_i \mid o_i)P(o_i)}{P(d_i)} = \omega_p \exp\left(\frac{-d_i^2}{2\sigma_s^2}\right), \quad (2)$$

where $d_i$ is the Euclidean distance between the gaze point and object $o_i$, expressed in the screen coordinates. $P(d_i|o_i)$ is the probability of observing distance $d_i$ between the gaze point and the object when the object is tracked. Such probability can be well approximated by the half-normal distribution, with the parameter $\sigma_s$ describing the magnitude of the eye-tracker error. $\omega_p$ is the importance of the position consistency relative to velocity consistency (from 0 to 1).

If the position consistency becomes unreliable, the target can still be tracked if its velocity is consistent with the smooth pursuit motion of the eye. The velocity computed directly from scan-paths is often considered an unreliable measure as it is dominated by the eye-tracker noise, saccades and the tremor of the eye. Fortunately, the smooth pursuit motion operates over longer time periods and thus can be extracted from the noisy data with the help of a low-pass filter, with the time constant, approximately equal to 2 seconds in this example. Although an exemplary value, this constant should not change significantly, as it should correspond with conditions in which the human visual system usually operates.

It has been found that the consistency of velocity $P(v_i)$ is the most robust if it is defined in terms of the angle between the low-pass filtered gaze-path velocity vector $u_t$ and the target velocity vector $v_{t,i}$, and is independent of the magnitude of these velocities. The correlate of such an angle is:

$$v = \frac{u_t \cdot v_{t,i} + \varepsilon}{\|u_t\|\|v_{t,i}\| + \varepsilon}, \quad (3)$$

where ∘ is a dot product and $\varepsilon$ is a small constant (0.001), which prevents division by 0 when either a target or a gaze point are stationary. Based on experimental data, the arccos of this correlation follows an exponential distribution. Hence, the likelihood of consistent velocity can be expressed by:

$$P(v_i) = \frac{P(v_i \mid o_i)P(o_i)}{P(v_i)} = \omega_v \exp\left(\frac{-\arccos(v)}{\sigma_v}\right), \quad (4)$$

where $\omega_v$ describes the allowable magnitude of the angular error. Analogous to $\omega_p$, $\omega_v$ is the importance of velocity consistency relative to the position consistency.

It should be noted that parameters $\sigma_s$, $\sigma_v$, $\omega_v$, and $\omega_p$ contain scene-dependent variability, and as such would ideally be fit on a per-scene basis for optimal target tracking.

Figure 5:
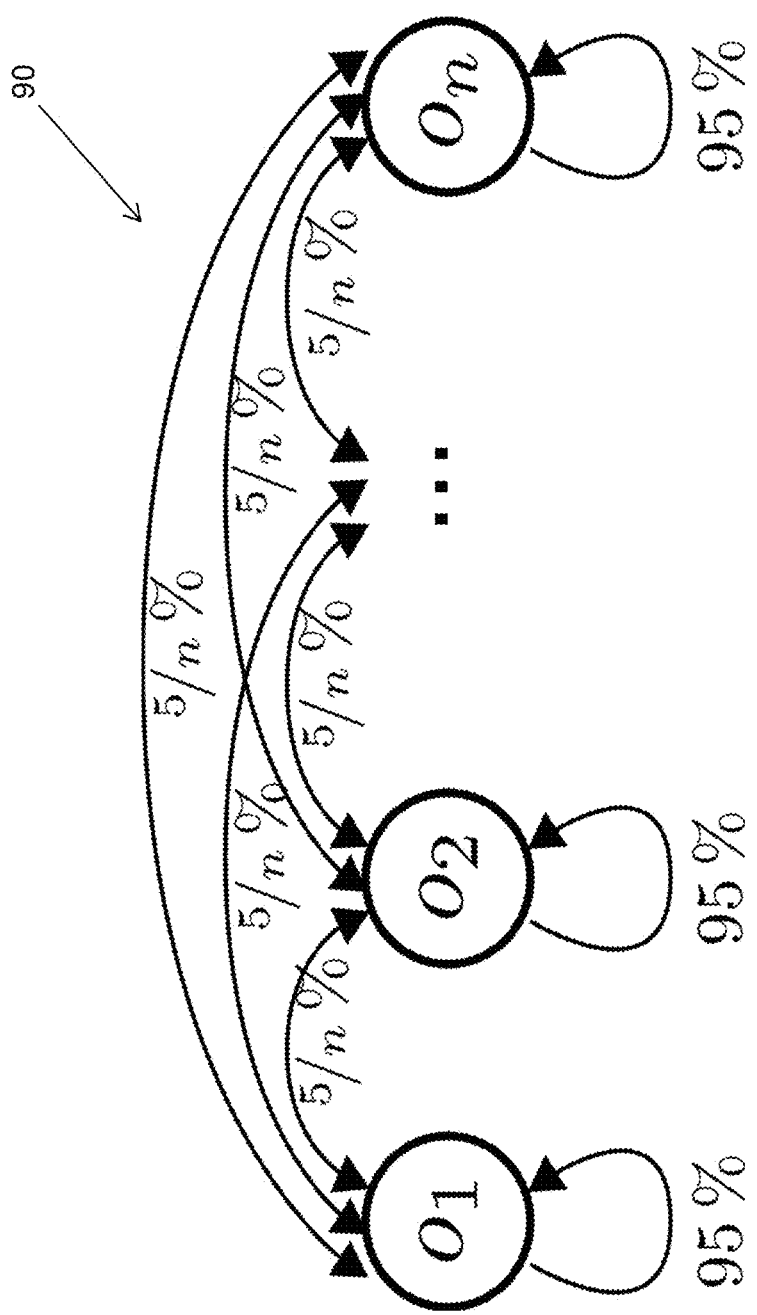
FIG. 5 is a state transition diagram for an example application of a Hidden-Markov-Model (HMM) applied to fixations by a GDOT module in one embodiment.

While a target tracking algorithm could compute the probability for each target at a given point in time (or frame) and choose the object with the highest probability. This, however, could result in frequent shifts of tracking from one target to another. In the method described herein, a PGM, such as a HMM is used to model the attention shifts between targets, which is an efficient way to penalise implausible interpretation of the data without excessive time delay. It should be noted that the method used is not restricted to an HMM; examples of other potential methods are conditional random fields and Kalman filters. As illustrated in the state diagram 90 shown in FIG. 5, each state in such a process corresponds to tracking a particular target 32. Since the fixation should not be too short, the probability of staying in a particular state is usually much higher than the probability of moving to another state (in our case 95% vs. 5%). This way the eye is more likely to keep tracking the same target than to rapidly jump from one target to another.

The solution of the HMM gives the most likely sequence of states (tracked targets) at a given point in time. The strength of this approach is that the best sequence is selected irrespective of the best sequence in the previous point in time, so that as the new data arrives, the decision to select a particular target 32 in the previous instance of time can be revised in favour of a more likely sequence. Because of that, it is advantageous to introduce a short delay between adding new probability values to the model and retrieving the resulting state. For the first order HMM, used in this example of the method, the best sequence can be efficiently computed using a dynamic programming algorithm called the Viterbi algorithm.

The proposed GDOT module 22 has various applications, some of which have been tested for suitability, namely in graphics oriented applications: a gaze-dependent depth of field simulation, a gaze-contingent controller in a computer game, and an eye-tracker-supported attention model.

It has been found that users prefer DoF simulation actively controlled by the temporal gaze direction because it enhances immersion in the virtual environment. Such a gaze-contingent induction of focal-cues can be seen as a substitute for a multi-focal plane display, which poses a huge technical challenge to build. To achieve gaze-contingent DoF simulation, the DoF rendering algorithm based on the reverse mapping technique with reduced color leakage was implemented. As compared to other implementations of similar rendering, use of the GDOT module 22 can improve accuracy and stability of the intended focus plane identification, even for fast moving objects.

Another application of the tracking technique described herein is for using an eye-tracker 10 as a game controller. For example, during the gameplay, it is possible to display information about an opponent's spacecraft just by looking at it. Also the camera starts to follow the attended target to create a more attractive way of aiming player's weapons. The GDOT module 22 can correctly identify targets that are followed by the smooth pursuit motion of the eye. The proposed method is also able to identify the objects that are smaller than the radius of the eye tracker error.

Because this method predicts the sequence of attended objects, it can be used as an attention model that interprets raw eye-tracker data. Attention modeling is usually associated with the computational models that interpret images and do not rely on the eye-tracker data. However, these can be unreliable because of the task-driven, top-down nature of the visual attention. Eye-tracking is believed to produce ground-truth attention patterns, but in practice such data is very noisy, restricted to relatively large objects and regions, and is even less reliable when the scene is animated. The proposed algorithm can filter raw eye-tracker data and extract the actual attention patterns, and thus greatly simplify the analysis of such data.

Yet another application of the tracking technique described herein is to use it as a sub-system in an eye-tracker 10 to enhance existing calibration methods (e.g., those fully described in PCT International Patent Application No. PCT/CA2012/050761). During the standard calibration operation of the eye-tracker, the tracker algorithm can be used to enhance the precision of the gaze points and to calculate proper calibration correction factors. The factors can then be applied either by adjusting the current calibration coefficients, or by providing an additional mapping stage for gaze data coordinates. Regardless of the possible inaccuracies typical for existing calibration methods, GDOT module 22 in such an application is able to identify with a certain degree of confidence the moving targets that are followed by the smooth pursuit motion of the eye, thus allowing computing the necessary correction. A similar approach is used to perform an intrinsic calibration in order to adaptively adjust a generic calibration mapping to a person's particular features. In such a procedure the observer does not even need to be aware of calibration correction factors being updated while one is viewing a complex scene. The natural gaze patterns are however continuously collected and used for the purpose of accuracy improvement. It should be appreciated that a combination of both methods is also feasible, where a user performs a one-time calibration (potentially using smooth pursuit information provided by the GDOT module), and has the calibration corrected periodically or continuously during a period of time of operation of the device via intrinsic calibration correction.

Figures 6, 7:
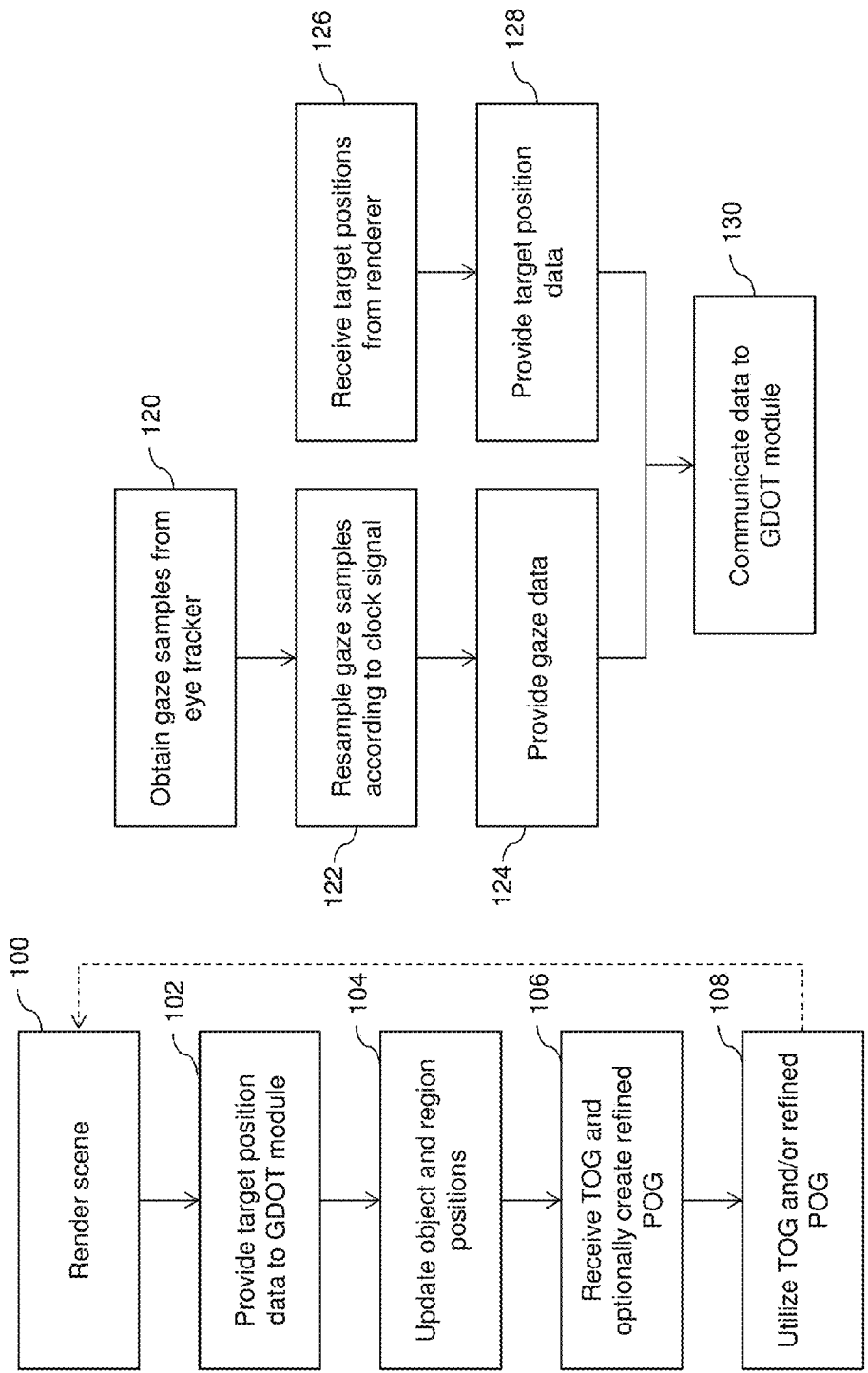
FIG. 6 is a flow chart illustrating example computer executable instruction performed by a 3D rendering engine interfaced with a GDOT module.
FIG. 7 is a flow chart illustrating example computer executable instruction performed by one or more interfaces between a GDOT module and other components of an eye tracking system.
Figure 8:
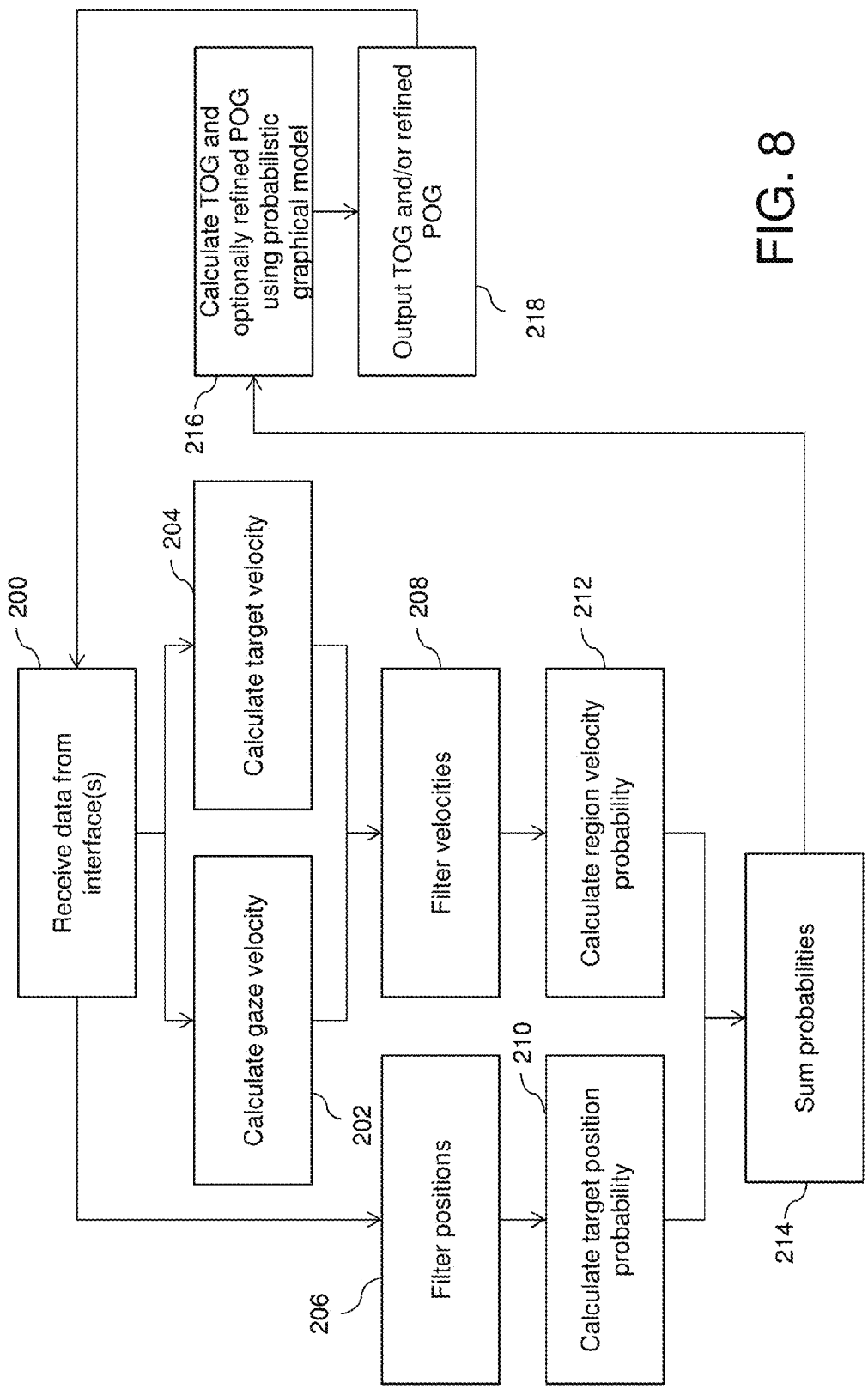
FIG. 8 is a flow chart illustrating example computer executable instruction performed by a GDOT module in generating a target-of-interest (TOI), which can optionally be used to determine a new point-of-gaze (POG), using knowledge of a scene being rendered and eye tracker data.

Turning now to FIGS. 6 to 8, example computer executable operations are shown that may be performed by the components shown and discussed above.

In FIG. 6, the rendering module 20 renders a scene at 100 and provides the target position data to the GDOT module 22, e.g. via the first interface module 50. As illustrated in FIG. 4, the object and region positions are updated at 104, with the TOI and optionally a refined POG being received from the GDOT module 22 at 106, which may be utilized at 108, e.g., in rendering the output of a video game.

FIG. 7 illustrates operations that may be performed by the first and second interface modules 50, 62. The gaze samples are obtained from the eye tracker 10 at 120 and are resampled at 122 as discussed above. The target positions are also received from the rendering engine 20 at 126 and the gaze data and target position data are provided at 124 and 128 respectively to communicate data to the GDOT module 22 at 130.

In FIG. 8, the GDOT module 22 receives the data from the interfaces 50, 62 at 200 and calculates the gaze velocity at 202 and the target velocity at 204. The velocities are then optionally filtered at 208, and the resultant data used to calculate the region velocity probability at 210. The same process can be applied to the position data, with it being optionally filtered at 206, and the resultant data used to calculate target position probability at 212. The TOI and optionally a refined POG may then be calculated at 216 and output at 218. The process may repeat to continuously or periodically provide refined POG data for a particular application based on a currently rendered scene.

It will be appreciated that any module or component exemplified herein that executes instructions may include or otherwise have access to computer readable media such as storage media, computer storage media, or data storage devices (removable and/or non-removable) such as, for example, magnetic disks, optical disks, or tape. Computer storage media may include volatile and non-volatile, removable and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by an application, module, or both. Any such computer storage media may be part of the eye tracker 10, GDOT module 22, rendering engine 20, display, any component of or related to such components, etc., or accessible or connectable thereto. Any application or module herein described may be implemented using computer readable/executable instructions that may be stored or otherwise held by such computer readable media.

The steps or operations in the flow charts and diagrams described herein are just for example. There may be many variations to these steps or operations without departing from the principles discussed above. For instance, the steps may be performed in a differing order, or steps may be added, deleted, or modified.

Although the above principles have been described with reference to certain specific examples, various modifications thereof will be apparent to those skilled in the art as outlined in the appended claims.

The invention claimed is:

1. A method of selecting targets of interest associated with tracking data in a scene over time, the method comprising:
   obtaining tracking data from a tracking device, the tracking data comprising at least one point of interest computed by the tracking device;
   obtaining target data from a scene information provider, the scene comprising a plurality of targets, the target data corresponding to targets in the scene and each target being represented by one or more points in the scene;
   applying a probabilistic graphical model to the tracking data and the target data to predict, for each point of interest being tracked, an associated target of interest, wherein:
   the probabilistic graphical model is constructed from the target data such that the states of the model represent targets from the target data, with edges connecting each target to itself and connecting targets to applicable other targets; and the probabilistic graphical model considers the at least one point of interest from the tracking data, and output a predicted target of interest for each point of interest from the tracking data; and outputting the predicted targets of interest as the selected targets of interest associated with the tracking data.

2. The method of claim 1, further comprising utilizing the selected targets of interest to enhance tracking accuracy.

3. The method of claim 2, wherein the utilizing comprises one or more of:

using the selected targets of interest as input to a system receiving tracked signal data; and sending the selected targets of interest to the tracking device, to assist in determining a true tracked signal.

4. The method of claim 1, further comprising providing the selected targets of interest for subsequent processing.

5. The method of claim 1, wherein tracking samples are resampled to provide the tracking data.

6. The method of claim 5, wherein the resampling is performed according to a clock signal provided by the scene information provider.

7. The method of claim 1, wherein the scene information provider corresponds to any one or more of:

a rendering engine used to render the scene;

one or more saliency mappings determined from recorded point of interest data;

one or more saliency mappings determined by machine learning or image processing; and video footage tracked using an image processing system.

8. The method of claim 1, further comprising:

calculating displacement-dependent information using the tracking data;

calculating displacement-dependent information using the target data; and applying the probabilistic graphical model comprises using the calculated information to generate the predicted targets of interest.

9. The method of claim 8, further comprising:

calculating a tracking velocity using the tracking data;

calculating a target velocity using the position data; and applying the probabilistic graphical model comprises using the tracking velocity and the target velocity to generate the predicted targets of interest.

10. The method of claim 8, further comprising:

computing displacement-dependent probabilities using the displacement-dependent tracking and target data;

performing a calculation on the computed probabilities to obtain probabilities of interest for each target; and applying the probabilistic graphical model comprises using the computed probabilities to generate the predicted targets of interest.

11. The method of claim 10, further comprising:

computing a region velocity probability using the tracking velocity and target velocity;

computing a target position probability using the tracking data and the target data;

summing the region velocity probability and the target position probability to obtain a probability of interest for each target; and applying the probabilistic graphical model comprises using the computed probabilities to generate the predicted targets of interest.

12. The method of claim 1, wherein the probabilistic model is based on a Hidden Markov model.

13. The method of claim 1, wherein the tracking data corresponds to gaze data obtained by an eye tracker, and the point of interest is a point of gaze.

14. The method of claim 1, further comprising using an initial calibration profile to obtain a point of gaze, a computed target of interest, and a refined point of gaze in performing an eye tracker calibration.

15. The method of claim 14, wherein the eye tracker calibration comprises using the refined point of interest in determining ground truth points of gaze during a smooth pursuit.

16. The method of claim 14, wherein the eye tracker calibration comprises using the associated target of interest and refined point of gaze to allow intrinsic calibration in a complex scene.

17. The method of claim 14, wherein the eye tracker calibration comprises using the associated target of interest and refined point of gaze to perform at least one additional calibration, using refined points of gaze as new ground truth points as the entity regards the scene.

18. A non-transitory computer readable medium comprising computer executable instructions for performing selecting targets of interest associated with tracking data in a scene over time, the computer readable medium comprising instructions for:

obtaining tracking data from a tracking device, the tracking data comprising at least one point of interest computed by the tracking device;

obtaining target data from a scene information provider, the scene comprising a plurality of targets, the target data corresponding to targets in the scene and each target being represented by one or more points in the scene;

applying a probabilistic graphical model to the tracking data and the target data to predict, for each point of interest being tracked, an associated target of interest, wherein:

the probabilistic graphical model is constructed from the target data such that the states of the model represent targets from the target data, with edges connecting each target to itself and connecting targets to applicable other targets; and the probabilistic graphical model considers the at least one point of interest from the tracking data, and output a predicted target of interest for each point of interest from the tracking data; and outputting the predicted targets of interest as the selected targets of interest associated with the tracking data.

19. A device for object tracking, the device comprising a processor and memory, and being coupled to at least tracking device, the memory storing computer executable instructions for selecting targets of interest associated with tracking data in a scene over time, by:

obtaining tracking data from a tracking device, the tracking data comprising at least one point of interest computed by the tracking device;

obtaining target data from a scene information provider, the scene comprising a plurality of targets, the target data corresponding to targets in the scene and each target being represented by one or more points in the scene;

applying a probabilistic graphical model to the tracking data and the target data to predict, for each point of interest being tracked, an associated target of interest, wherein:

the probabilistic graphical model is constructed from the target data such that the states of the model represent targets from the target data, with edges connecting each target to itself and connecting targets to applicable other targets; and the probabilistic graphical model considers the at least one point of interest from the tracking data, and output a predicted target of interest for each point of interest from the tracking data; and outputting the predicted targets of interest as the selected targets of interest associated with the tracking data.

20. The device of claim 19, wherein the device is further coupled to a scene information provider device configured to generate the scene.

21. The device of claim 19, wherein the device is integrated into the tracking device.

* * * * *